Oct. 23, 1962 W. T. RENTSCHLER 3,059,557
PHOTOGRAPHIC CAMERA
Filed Feb. 28, 1961 2 Sheets-Sheet 1

Fig. 1

INVENTOR.
Waldemar T. Rentschler
BY
March and Curtiss
ATTORNEYS

Oct. 23, 1962 W. T. RENTSCHLER 3,059,557
PHOTOGRAPHIC CAMERA
Filed Feb. 28, 1961 2 Sheets-Sheet 2

INVENTOR.
Waldemar T. Rentschler
BY
March and Curtiss
ATTORNEYS 3,059,557
PHOTOGRAPHIC CAMERA
Waldemar T. Rentschler, Calmbach (Enz), Germany, assignor to Alfred Gauthier, G.m.b.H., Calmbach (Enz), Germany, a corporation of Germany
Filed Feb. 28, 1961, Ser. No. 92,250
Claims priority, application Germany Mar. 4, 1960
5 Claims. (Cl. 95—53)

This invention relates to photographic cameras of the type wherein release of the camera shutter is effected automatically upon completion of the setting motion of a setting member which is operated by a powered driving mechanism.

Cameras characterized by the above operation comprise, for example, those having a pre-selection self-adjusting spring diaphragm or those provided with a covering or protection diaphragm, as well as cameras incorporating an automatic exposure regulator wherein the movable member of a light-intensity measuring device controls a stop or abutment for a powered exposure setting member. For the purpose of insuring the correct mode of operation it is necessary in cameras of the above type to correlate the adjusting movement of the setting member, which is driven by a powered mechanism, with the release of the camera shutter in such a way that the setting member will have fully attained its proper adjusted position prior to the commencement of opening of the camera shutter. In known cameras utilizing this arrangement the desired above-stated object is attained by the utilization of delayed-action mechanisms, wherein the start of opening of the shutter is delayed by a predetermined time with respect to the actuation of the camera release member. This delay time is so selected that, in its duration the setting member may travel through the maximum path of movement of which it is capable, which is the condition where no stop or abutment is positioned in its path to shorten the adjusting movement. However, the use of such a delayed-action mechanism requires a comparatively large and not always readily available space for its installation. In addition, the cost of fabrication of such mechanisms is comparatively high. Further, the synchronization of the running down processes involving the delayed-action mechanism is not positive at all times, so that in some circumstances where the movement of the setting member involves the maximum amount of time, a release of the camera shutter may undesirably occur prior to the setting member attaining its final adjusted position.

The above drawbacks and disadvantages of cameras of the identified type are obviated by the present invention, and one object of the invention is to provide a novel and improved camera structure wherein the adjustment of the setting member is correlated with the release of the camera shutter in an optimally dependable manner while at the same time requiring but few structural members and relatively small space.

This object is accomplished, in accordance with the invention, by the provision of a novel release device comprising an inertia-actuated member or body and by movably mounting on the setting member or on a member which is drivingly connected to the setting member, such a body having a certain amount of mass whereby its momentum effects its movement when the carrier therefor or the setting member is suddenly brought to a halt at the completion of the setting movement. The carrier member or means for the momentum-operated body moves in the same direction and with the same speed as the setting member, preferably, and the said body or member which is under the control of its momentum also moves in the same direction and at the same speed as the carrier means (or as the setting member of the camera, as the case may be). Upon sudden halting of the setting member in its adjusted position a relative movement occurs between the momentum-actuated member and its carrier means, during which relative movement the said momentum-operated member effects a release of a locking device arranged to retain in cocked position the driving mechanism of the camera shutter. Accordingly, such release of the locking device now effects release of the shutter.

A camera as thus constructed in accordance with the invention has the advantage that the release of the camera shutter can be effected in a positive manner and only as a consequence of attainment by the setting member of its final, adjusted position. This results in the greatest possible functional dependability and reliability with respect to the method of operation of the camera. In order to correlate in such a positive manner the adjusting movement of the setting member and the release of the camera shutter, but a single member may be utilized, namely the momentum-operated member or body having a certain amount of mass which is arranged in the above described manner, i.e., movably mounted on the setting member or else on a carrier means which is drivingly connected to the setting member, the operation being such that upon completion of the adjusting movement of the setting member and halting of the same, the said novel release device owing to its inertia or momentum experiences relative movement with respect to its carrier, during which movement there is released a locking device or latch which normally retains in cocked condition the driving mechanism of the camera shutter. This has the desirable result that no special synchronizing mechanisms are required in the organization as provided by the invention, for the purpose of obtaining the above-mentioned positive correlation and sequential operation. Accordingly, the shutter control mechanism as provided by the invention is characterized by extreme simplicity, with very few members, enabling a compact arrangement to be had which requires but little space.

In order to insure a positive release of the camera shutter even if the same requires a comparatively strong release force, the said novel release device which is movable with respect to its carrier may comprise a release member which is powered by a driving spring mounted on the carrier, and which may be itself released by an inertia latch member constituted as a portion of the release device, said latch member being then the body actuated by its momentum. The said powered release member may be shifted into a cocked position conjointly with the cocking movement of the setting member, and may be retained in such cocked position by the said inertia latch member until such time as the setting movement is suddenly halted upon completion of adjustment of the setting member.

In a device constructed in this manner it is of special advantage when considering the matter of functional dependability, to arrange a retainer means by which the inertia latch member will be positively retained in its latching position which is associated with the cocked condition of the setting member, such means becoming inoperative at the commencement of the setting movement of the setting member.

A construction of such retainer means for holding the latch member in its latching position which is especially advantageous with regard to a simple structure and economical manufacture, is had by constituting such means as a ramp which is carried on a fixed portion of the camera and which engages the latch member at the time that the latter is holding in its cocked position the release member of the release device.

In addition, the cooperation between the release device and the locking device which retains in its cocked position the driving mechanism for the camera shutter is obtainable in a simple manner which provides a flexible arrangement of the camera, by utilizing a transmission member which is connected to the locking device and which has a series of stops extending for a distance corresponding at least to the maximum range of movement of the setting member. The said series of stops may, for example, comprise gearing or gear teeth with which the release device is engageable. Such teeth may be engaged directly by the momentum-operated member of the release device, or else by the powered release member which is controlled by the momentum-operated member. The engagement of said teeth results from the relative movement which the release device has at the time that the movement of the setting member is abruptly terminated and brought to a halt. Such engagement actuates the transmission member and effects a release of the cocked driving mechanism for the camera shutter.

The invention will be explained in detail below, wherein there are illustrated two diagrammatically represented embodiments. These embodiment are illustrated in FIGS. 1 and 2, and relate to a photographic camera of the type provided with an automatic exposure regulator or setting mechanism.

In the drawings:

FIG. 1 is a diagrammatic representation of an automatically operated camera setting mechanism incorporating the novel control and release device for effecting positive sequential operation of the setting member and camera shutter.

In the figures, components which are similar and have similar functions have been given identical numerals.

Figure 2:
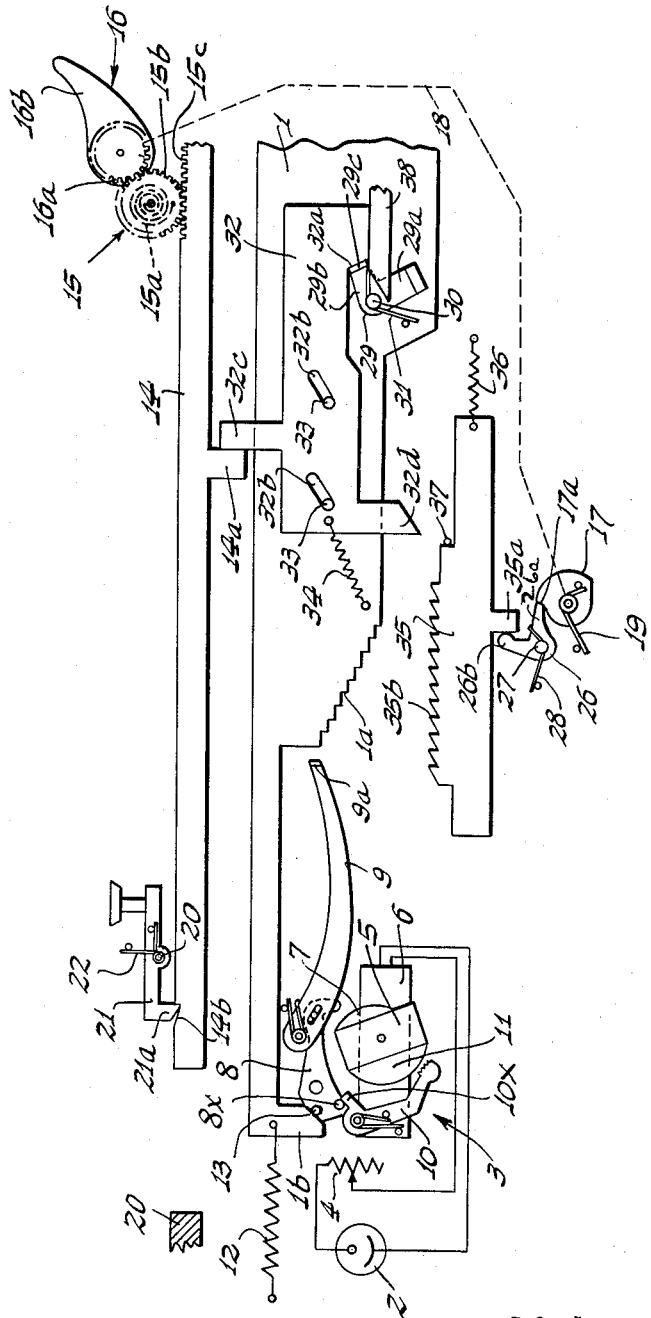
FIG. 2 is a similar representation, illustrating a modified form of control means which is more powerful for effecting the said positive, sequential operation of the setting member and camera shutter.

Referring first to FIG. 1, the exposure setting member of the camera is indicated by the numeral 1. Such setting member may, for example, control the exposure time or else the diaphragm, or else may effect various exposure values involving both shutter speed and diaphragm adjustment. The automatic exposure regulator of the camera comprises a well known galvanometer-type instrument movement 3, which is energized by current from a photoelectric cell 2, the current-intensity being controlled by and adjustable resistor 4. The turnable coil 5 of the galvanometer 3 is mounted on a carrier member 6, and has a control cam 7 which is engageable by a pivotally mounted sensing lever 8 for the purpose of sensing the respective adjusted positions of the turnable coil 5 as determined by the light intensity and existing light conditions.

In order to utilize the respective adjusted positions of the turnable coil 5 and communicate these, as sensed by the sensing lever 8, to the setting member 1, and additional pivotally mounted lever 9 is provided, having a pin-and-slot connection with the sensing lever 8 as shown. The lever 9 is biased in a clockwise direction by a wire coil spring, as shown. An end portion 9a of the lever 9 is adapted to cooperate with a stepped abutting edge 1a provided on the setting member 1.

For the purpose of retaining the turnable coil 5 in its various adjusted positions during the sensing process, the sensing lever 8 is further connected to a brake lever 10 by menas of an abutting separable connection comprising a pin 8x on the lever 8 and a lug 10x on the lever 10. The brake lever 10 is biased in a counterclockwise direction by a wire coil spring, as shown. The lever 10 is cooperable with a brake member or surface 11 provided on a turnable coil 5. The movement of the two levers 8 and 10 are so correlated with respect to each other, that during the sensing operation the sensing lever 8 engages the cam 7 at a time later than the time of engagement of the brake lever 10 with the braking surface 11. The setting member 1 is shown, in a starting or cocked position which is associated with the cocked state of a driving spring 12 imparting a right-to-left bias to the setting member. In order to insure, for these conditions, free movement of the turnable coil 5 of the galvanometer 3 so that it may respond in a sensitive and accurate manner to the prevailing light intensity, the two levers 8 and 10 are disengageable from the associated members 7 and 11 respectively. This is accomplished by providing on the setting member 1 an actuator lug 1b which effects a counterclockwise pivotal movement of the lever 8 by engagement with a pin 13 carried on such lever. Thus, the two levers 8 and 10 are shifted into and retained in their disengaged positions as illustrated just prior to the setting member 1 reaching its cocked position when it is being returned.

The sudden halting of the setting member 1 during its adjusting movement from right-to-left under the action of the driving spring 12 is effected by its engagement with the stop portion 9a of the lever 9 when such lever has been adjustably positioned so as to be indicative of the intensity of light . The action involved is as follows: After a short initial movement of the setting member 1 from right to left, the lug 1b becomes disengaged from the pin 13 whereupon the levers 8 and 10 are freed and the lever 8 is permitted to engage the cam 7. Due to the response of the turnable coil 5 of the galvanometer to the current supplied by the photoelectric cell 2, the sensing position of the lever 8 will be indicative of the prevailing light conditions and light intensity. Such positioning of the sensing lever 8 is accompanied by an adjustable positioning of the stop lever 9 whereby the lug 9a thereof will be so placed as to engage one of the steps of the edge 1a of the setting member. Thus, the setting member will travel a greater or lesser distance from its cocked position shown in the Figures, depending upon the position of the stop lever 9.

The structure of the above described light intensity measuring device and of the stop mechanism comprising the levers 9 and 10 is well known and is illustrated, for example, in Austrian Patent 202,861. Also, it is illustrated and described in my copending U.S. application Serial No. 5,133, filed January 29, 1960, and entitled Photographic Camera.

A control member 14 is provided for the purpose of shifting the member 1 into the cocked position shown. The said control member 14 is powered by a driving mechanism 15 comprising a spiral spring 15a connected with a gear wheel 15b which meshes with a rack 15c provided on the member 14. The cocking of the driving member 15 is effected by means of a film transport device 16 having a gear 16a meshing with the gear 15b, and having a manually operable knob 16b. The film transport device 16 also serves in a well-known manner to cock the main driving disk 17 of the camera shutter. This is accomplished by a mechanical connection, which is indicated by the broken line 18 in the figures. Further details concerning the driving connection 18 are not given here for reasons of clarity of illustration.

Also not shown for reasons of clarity of illustration are the details of the shutter driving mechanism, comprising the components which are connected to the driving disk 17 and which effect opening and closing of the shutter in response to counterclockwise turning movement of the disk. Shutter drives of this type are well known in the camera art, and details of the same may be found in my Patent No. 2,948,205, filed November 12, 1952, and entitled Intra Lens Shutter.

The shutter drive disk 17, which is acted on by a driving spring 19, may serve in a well-known manner to drive an intra-lens shutter assemblage, as will be readily understood. The connection (not shown) between the driving disk 17 and the shutter actuating ring (also not shown) which is common to this type of shutter drive, as shown in the above U.S. patent, is effected by a driving link which is pivotally connected to the disk 17 and which transforms the one-way turning movement of the drive disk 17 into a reciprocating movement of the shutter actuating ring and of the shutter blades.

When cocking the driving mechanism 15 for the control member 14, the latter is shifted from a left-most end position wherein it engages a fixed stop 20 toward the right into the cocked position shown. During this movement, an arm 14a of the control member 14 engages in the embodiment of FIG. 1 a lug 1c of the exposure setting member 1, moving the latter also into the cocked position shown.

An arresting lever 21 positioned about a fixed axis 20 provided on the camera, serves to retain the members 1 and 14 in their cocked positions. The lug 21a of the member 20 enters, under the action of a spring 22, a recess 14b provided on the control member 14. The arresting lever 21 is operatively connected with the release mechanism of the camera in a well-known manner, which is not shown for the sake of clarity of illustration.

In accordance with the present invention a positive and reliable, sequential operation of the exposure setting member 1 and of the camera shutter blades is effected, such sequential operation being characterized by the exposure setting member completing its adjusted movement as determined by the stop lever 9 under the control of the light intensity measuring device, before the camera shutter commences to open. This is accomplished by the provision of a novel release device which is under the control of momentum and which comprises a member having a certain amount of mass, which member is movably mounted on the exposure setting member 1, both members moving together during the adjusting, setting movement of the setting member whereby they have a same velocity and direction of movement. Upon the exposure setting member being abruptly halted in its adjusted position by the stop portion 9a of the stop lever 9, the release device comprising the momentum-operated member continues its movement. That is, it has relative movement with respect to the setting member and such continued or relative movement is utilized for the purpose of releasing the camera shutter. Specifically, the said novel release device comprising the momentum-operated member engages and effects release of a locking device which is associated with the driving disk 17 of the shutter and which retains the said disk in its cocked position.

In the embodiment of the invention shown in FIG. 1 the momentum-operated member having a certain amount of mass comprises a slide 23. The said slide 23 has two guide slots 23a extending obliquely to the direction of movement of the exposure setting member 1, and guide pins 24 affixed to the exposure setting member 1 extend through the slots 23a as shown. A light spring 25 is connected between the exposure setting member 1 and the release device comprising the slide 23 to normally bias the slide in a retracted position as seen in FIG. 1.

The slide 23 has an arm 23b adapted to engage, in a manner to be described below, the locking device which retains the driving disk 17 of the camera shutter in its cocked position. The said locking device comprises an arresting lever 26 which is pivotally movable about an axis 27 secured in the shutter assemblage, the said lever being biased in a clockwise direction by a spring 28. One arm 26a of the lever 26 engages a projection 17a of the driving disk 17 when the latter is in the cocked position shown. The other arm 26b is arranged for engagement with a lug 35a provided on a transmission member 35, shown as comprising a slide which is movable from the position shown toward the left.

While it is not essential, in accordance with the invention, to actuate the arresting lever 26 through the intermediary of the transmission member 35, this is a preferred form of connection which has been found to be advantageous. The path of travel of the transmission member 35 is parallel to the direction of movement of the exposure setting member 1, such transmission member being biased to the right by a spring 36 which tends to maintain it in engagement with a fixed stop pin 37. This end position of the slide 35 is correlated, as may be understood from an inspection of FIG. 1, with the locking position of the arresting lever 26. In order to cooperate with the lever 26, the slide has the aforementioned arm or lug 35a, which is engageable with the arm 26b of the arresting lever under the action of the spring 28 provided for the latter.

To effect a driving connection between the slides 23 and 35, the latter has a series of ratchet or gear teeth 35b disposed in a row and arranged for engagement with the arm 23b of the slide 23. The length of the row of teeth 35b is at least as great as the extent of movement of the exposure setting member 1.

By the use of the transmission member 35 constructed in the above described manner there is had the advantage of a flexible arrangement and construction in a camera, to which there may be adapted in the best possible manner the respective camera or shutter structure and by which the exposure setting member and the locking device which retains the driving mechanism of the shutter in its cocked position may be most readily operatively connected. Moreover, this produces in an uncomplicated manner a ready adaptability of the release device to the respective setting range or extent of movement of the exposure setting member.

Referring now to the embodiment of the invention illustrated in FIG. 2, components which are similar to those already described in FIG. 1 have been given like characters. The structure shown in FIG. 2 which differs from that of FIG. 1 involves the construction and arrangement of the release device which is carried by the setting member 1. Whereas in FIG. 1 the said release device comprises essentially the slide 23 having a certain amount of mass by which it is impelled forward or from right to left under its momentum when the setting member 1 is brought to a sudden halt, in FIG. 2 the release device comprises essentially two members, a slide 32 which is spring-powered and a momentum actuated member in the form of a lever or bell crank 29 which constitutes a latch to hold the slide 32 in retracted position until the moment when the setting member 1 is brought to a halt. The bell crank 29 is carried by an axis 30 secured to the exposure setting member 1, and is biased in a counter-clockwise direction by a light spring 31. One arm 29a of the latch 29 forms the actual body of mass which responds to its inertia, and swings the latch 29 clockwise upon the setting member 1 being brought to a halt. Such halting of the setting member 1 is occasioned by engagement between the stop portion 9a of the stop lever 9 and one of the steps or notches on the stepped abutting edge 1a. The inertia of the latch 29, as mentioned above, effects a pivoting of such lever in a clockwise direction. The other arm 29b of the lever 29 is engageable with the release member 32 which is also constituted as a slide and which, for such purpose has an arresting lug or shoulder 32a arranged for engagement with a lug 29c provided on the latch 29. The release member comprising the slide 32 is carried by the exposure setting member 1 and is relatively movable with respect to the same, having pin-and-slot connections 32b, 33 therewith. A spring 34 is connected between the setting member 1 and the slide 32, and functions to drive the slide in a forward or right to left direction upon the slide being released by the momentum actuated latch 29.

The cocking of the slide 32 against the action of its driving spring 34 is effected conjointly with the cocking of the exposure setting member 1. For this purpose, the slide 32 has an arm 32c which is disposed in the path of movement of a lug 14a provided on the control member 14.

Upon the control member 14 being shifted from left to right to its cocked position, the lug 14a engages the arm 32c of the release slide 32 and shifts the latter into the cocked position shown in FIG. 2.

For such position, the arresting lug 29c of the angle lever or latch 29 engages under the action of the spring 31 biasing said latch counterclockwise, the projection or shoulder 32a of the slide, thereby to secure the latter in the cocked position. Upon the continuing cocking movement of the control member 14, the pin-and-slot guide 32a, 33 of the release member becomes operative as a driving mechanism for cocking the exposure setting member 1, whereby the latter is shifted to the cocked position shown in FIG. 2. To secure the latching lever 29 in its latching position, a stationary ramp 38 is provided which is engaged by the arresting lug 29c of the latch at the time that the exposure setting member 1 is cocked.

For the purpose of effecting release of the locking device 17a, 26a which retains the driving disk 17 of the camera shutter in its cocked position, the release slide 32 is provided with an arm 32d which extends perpendicular to the direction of movement of the exposure setting member 1. The manner in which the arm 32d effects the release of the camera shutter involves the transmission member 35 and is similar to that already described above. It will be again referred to at a later point.

The use of a spring powered release device comprising the slide 32 and latch 29 as above described has the advantage that a dependable release of the camera shutter is insured even if such release requires a comparative strong force or movement of force. This is in consequence of the slide 32 being powered by the driving spring 34 whereby the strength of such driving spring may be selected to always dependably actuate the transmission slide 35 so as to effect release of the shutter driving disk 17.

As above described, movement of the transmission slide 35 to the left from the starting position shown in FIG. 2 results in counterclockwise turning of the arresting lever 26, thereby to free the shutter drive disk 17 for operation of the shutter. It will be understood that upon completion of the right-to-left adjusting movement of the setting member 1 shown in FIG. 2, the halting of such setting member by the lug 9a of the stop lever 9 engaging one of the steps of the edge 1a, will cause the latch 29 (due to the mass of the arm 29a of the latch) to swing clockwise, thereby releasing the slide 32 for forward or right-to-left driving movement under the action of the driving spring. Such driving movement causes the arm 32d of the slide to engage and shift from left to right the transmission member 35, thereby to effect release of the shutter driving disk 17.

The operation of the camera and of the embodiments illustrated and described above is as follows:

With the various components illustrated in their cocked positions as shown in the drawings, actuation of the camera release member (not shown) effects a clockwise pivotal movement of the detent lever 21 which then releases the control member 14. The right-to-left running down movement of the control member 14 which now occurs is followed by a similar movement of the exposure setting member 1 under the action of its driving spring 12. After a short initial movement of the setting member 1 the lug 1b thereof becomes disengaged from the pin 13, thereby freeing the sensing member 8 by which the latter is now enabled to sense the rotative position of the turnable coil 5 of the galvanometer 3. As already stated, the rotative position of the galvanometer 5 is indicative or a function of the intensity of the prevailing light conditions. Depending on the position of the coil 5, the sensing lever 8 and the stop lever 9 are located in adjusted positions which are also indicative of the light intensity. Thus, the moving setting member 1 will be abruptly halted at a certain point in its path of travel, when a portion of the stepped edge 1a engages the lug 9a of the stop lever 9.

In FIG. 1, the release device comprising the slide 23 moves concurrently with the setting member 1 until such time as the latter is halted in its adjusted position. The slide 23 has the same speed and direction of movement as the setting member prior to such halting. Upon the setting member 1 striking the stop lug 9a and upon the consequent halting of the setting member, the slide 23 continues to move under its momentum, as permitted by the pin-and-slot connections 23a, 24. Thus, a relative movement of such slide is effected with respect to the setting member 1. During such relative movement, the arm 23b of the slide 23 strikes and engages one of the teeth 35b of the transmission slide member 35, moving the latter to the left against the action of the spring 36. This causes the arresting lever 26 to be pivoted in a counterclockwise direction by the arm 35a, thereby releasing the shutter drive disk 17 for its running down movement.

Considering the embodiment of the invention illustrated in FIG. 2, as the setting member 1 is shifted from right-to-left and then halted by the stop lug 9a, the inertia of the latch 29 which is traveling with the setting member will cause said latch to have a relative clockwise movement whereby the lug 29c thereof becomes disengaged from the shoulder 32a of the release slide 32. This movement of the latch 29 is possible since it has left and become disengaged from the ramp 38 and is no longer locked in its latching position. Upon unlatching of the slide 32 in the above manner, the spring 34 causes the slide to shift to the left and downward as seen in FIG. 2, whereby the arm 32d thereof engages one of the teeth 35b, shifting the transmission member 35 to the left in the same manner as in FIG. 1, thereby effecting release of the shutter drive disk 17.

For the purpose of presenting the operation of the present device in a simple and clearly understood manner the members 1, 14, 23, 32 and 35 are illustrated as longitudinally displaceable, slide-like structures in the figures. Such representation however, does not signify any limitation with respect to the said members. In carrying out the invention, these identified members may be constructed in any suitable manner, as for example in the form of rings, disks, segments or the like.

In the foregoing description the invention has been explained in connection with a photographic camera provided with an automatic exposure regulator. However, in addition to its application to such camera, the invention has utility in connection with cameras of all kinds wherein the release of the camera shutter is effected in response to the setting movement of the setting member which is actuated by a powered driving mechanism. This includes especially one-eye reflex cameras having a preselection spring diaphragm, as well as cameras provided with a cover-type diaphragm. Diaphragm devices of this type comprise a spring-loaded setting member which moves, in response to the actuation of the camera release member, from a starting position corresponding to the largest diaphragm aperture or from a covering position of the diaphragm, under the action of a spring, into a setting position which is determined by an adjustable stop. In so doing, the diaphragm aperture is adjusted to the preset value.

For all of the above cameras the present invention has the advantage that special, costly synchronizing mechanisms are not required in order to obtain a mutual adjustment or correlation of the setting motion of the setting member and of the release of the camera shutter in the manner mentioned initially in the preamble of this specification. On the contrary, an accurate and reliable sequential operation of the setting member and camera shutter is obtained in a surprisingly simple, positive manner by the present invention, without requiring any substantial additional expenditure in the manufacturing process, by virtue of the provision of the inertia or momentum-operated member having a certain amount of mass, which is utilized to effect the sequentially occurring functions. As provided by the invention, such momentum-operated member is made operative as a consequence of halting of the setting member in its adjusted setting position, thereby to effect a release of the camera shutter.

I claim:

1. In a photographic camera, in combination, a movable setting member; a powered driving mechanism operable in response to actuation of the camera release, for actuating said setting member; means for stopping the setting member in a predetermined adjusted position; a release device under the control of momentum and carrier means movably carrying the release device, said carrier means being movable with and at the same speed as the setting member during the adjustment of the latter and said release device being operative as a consequence of its momentum when the carrier means and setting member are halted in adjusted position of the latter; a shutter drive; and a locking device for holding the shutter drive in cocked position, said release device during its shifting movement effecting release of the said locking device, thereby to release the camera shutter.

2. A camera as in claim 1, in which the release device includes a release member movably mounted on the carrier means and a driving spring for shifting said member from a cocked position through a working stroke which effects release of the locking device, in which there are means for shifting the release member to cocked position conjointly with movement of the setting member to cocked position, and in which the release device further includes a latch member for locking the release member in cocked position, the shifting of said latch member in response to its momentum freeing the release member for movement through its working stroke.

3. A camera as in claim 1, in which there is a movable transmission member which is shiftable to release the said locking device and which has a series of abutments extending for a distance at least as great as the path of travel of the setting member, said release device when operative being engageable with one of said abutments to shift the transmission member for releasing the camera shutter.

4. A camera as in claim 2, in which there is a detent means operative when the setting member is in the cocked position, for holding the latch member in its locking position, said detent means being rendered inoperative at the start of adjusting movement of the setting member.

5. A camera as in claim 4, in which the detent means comprises a ramp carried by a fixed part of the camera and engageable with the latch member when the setting member is in cocked position.

References Cited in the file of this patent

FOREIGN PATENTS 1,216,940     France _____ Dec. 7, 1959